Feb. 23, 1971      B. R. SASSELLI      3,564,863
REFRIGERATION SYSTEM PURIFIER
Filed May 14, 1969      2 Sheets-Sheet 1
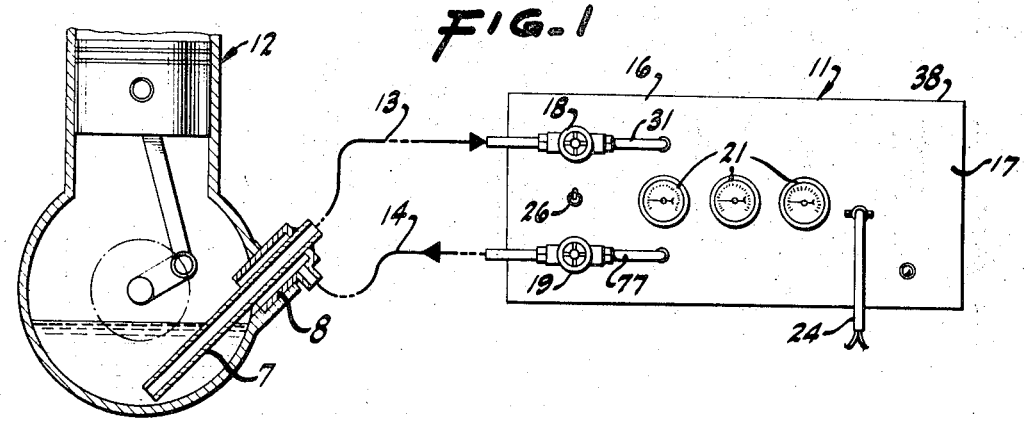
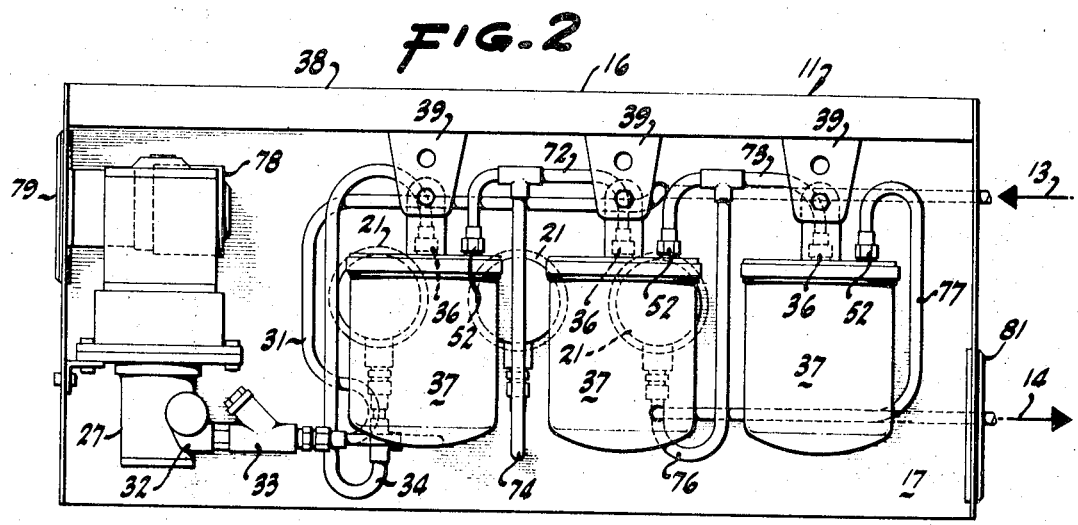
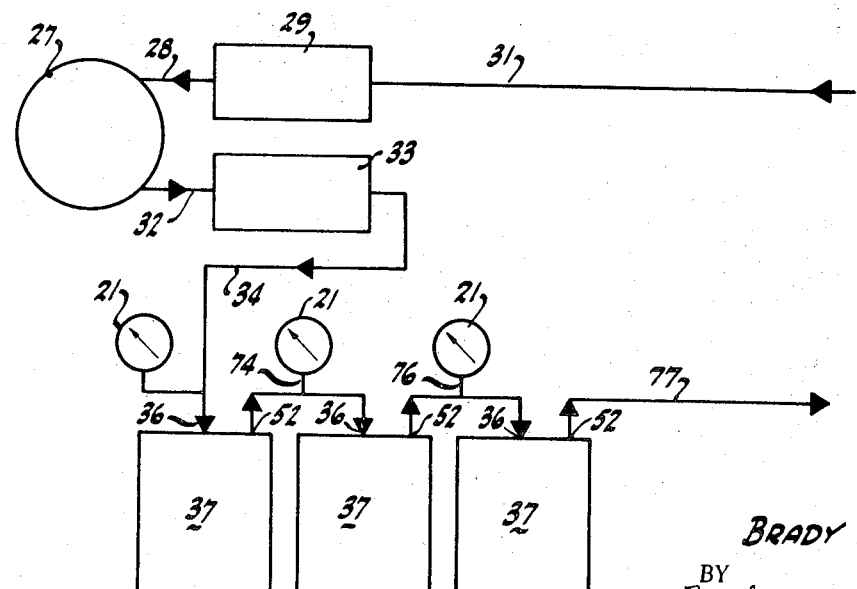
INVENTOR.
BRADY R. SASSELLI
BY
Baylsen, Mohler, Foster
+ Schlemmer
ATTORNEYS

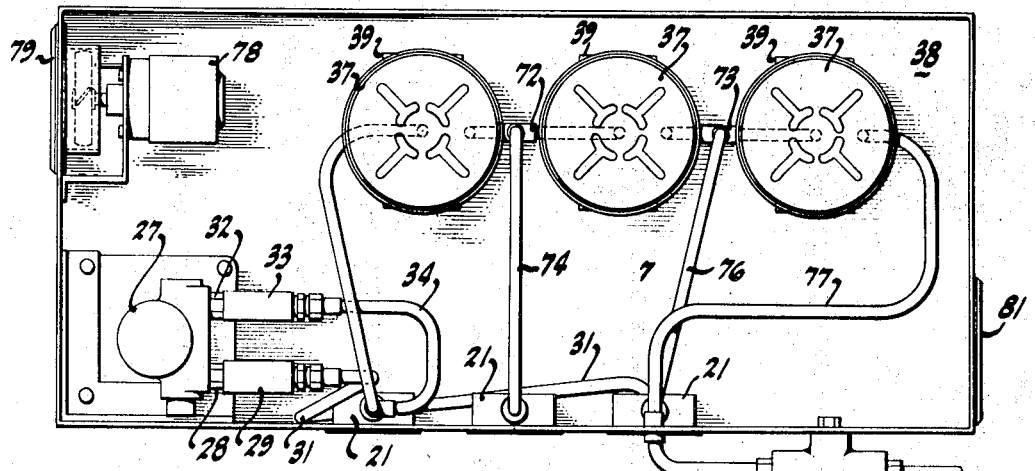
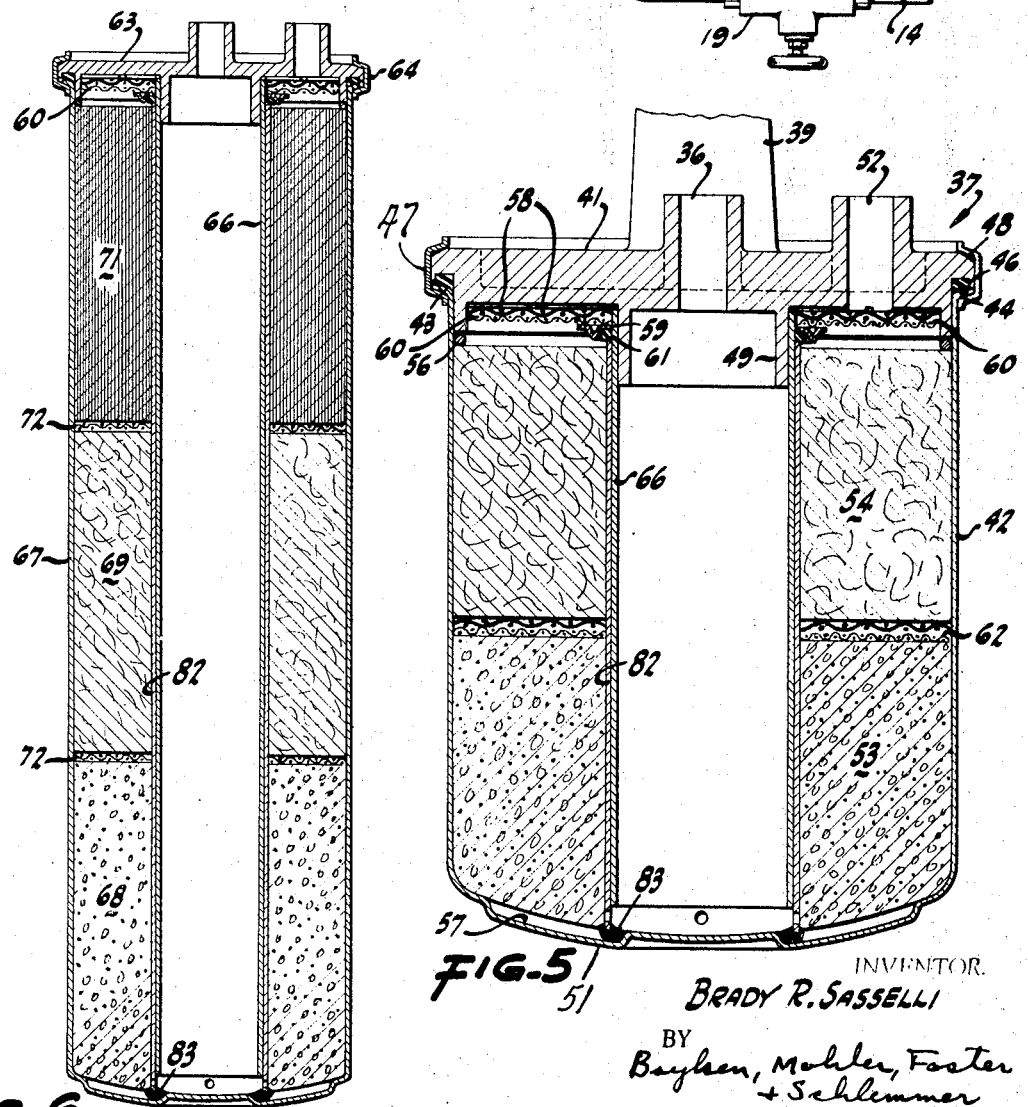

United States Patent Office 3,564,863
Patented Feb. 23, 1971

3,564,863
REFRIGERATION SYSTEM PURIFIER
Brady R. Sasselli, Tustin, Calif., assignor to Refrigeration System Purifiers, Tustin, Calif., a corporation of California
Filed May 14, 1968, Ser. No. 735,487
Int. Cl. F25b 43/02
U.S. Cl. 62—84　　　　　　　　　　　　　　　　2 Claims

ABSTRACT OF THE DISCLOSURE

A portable fluid purifier for temporary connection to a refrigeration system, primarily the compressor, is provided with a sequence of filtering media contained in one or more filter elements. The media are separated by flow facilitating screens and the filter elements are provided with flow facilitating channels and a tight but readily releasable seal.

BACKGROUND OF THE INVENTION

The invention relates to purifiers for refrigeration oil and refrigerants and the like and in particular to portable purifiers which may be connected directly to refrigeration systems so that oil and refrigerant may be purified without bulk removal thereof from the systems allowing the systems to remain operational. Other uses for the invention will also be apparent to those skilled in the art, but since the invention has been developed primarily for use in a refrigeration system, it will be so disclosed.

One of the major problems in the maintenance of air conditioners and other refrigeration systems is that of maintaining the refrigerant and the oil free of contaminants. Refrigeration coolant, which is generally made up of a liquid such as Du Pont's "Freon" in solution with an oil, must be extremely pure to assure trouble-free operation, particularly under modern operating conditions where the temperatures are higher and the compressors run faster and are precisely built to closer tolerances.

Numerous contaminants are available and are readily picked up by the coolant solution such as air, antifreeze agents, water, soldering flux, chlorinated solvents, metal chips and dirt. Further, sludge can form in the compressor oil in the presence of high temperatures and other contaminants such as air, acids may form by combination of water with salts produced from the reaction of metals in the system with the oil and metal oxides may form from the reaction of contaminants such as air with the metals in the system. These contaminants work in many ways to destroy the operation of the system. Dirt, metal chips, and sludge can clog the system, water can freeze, copper can be plated on other surfaces, and parts such as insulation may be eaten away by rust, corrosion or acids. These problems may in turn lead to the failure of individual parts, and in particular they may lead to a compressor burnout. A compressor burnout itself, because of the high temperatures involved, and the resulting damage to the compressor, generally causes a marked increase in the number of contaminants in the system. It has thus become a standard procedure in the industry to periodically purify refrigerant, and after a compressor burnout, such a purification is essential before the system can be restarted.

As it is generally done, purification of refrigeration coolant is an elaborate and expensive business, an essential step of which is the removal of the coolant in bulk from the system, perhaps for shipment to some other place for treatment if it is to be saved at all. In addition to being an expensive procedure, it is a troublesome one because the system must be shut down. Further, the procedure takes time and it may be necessary to have two supplies of coolant so that the system may be used during the treatment period or at least filled during that time to prevent oxidation in the presence of air. Contamination of the purified refrigerant, particularly with water and air, must also be prevented during transportation from the place of treatment and during its transfer from its shipping container back into the system.

A number of companies are currently making full-flow filters which may be permanently installed in the line of a refrigeration system. These help and do provide some protection. They are expensive and difficult to install and service on most systems, however, and they will not filter out particles of less than 25 to 50 microns. Further, some of these tend to dump contaminants back into the system over a period of time and especially when purifying a system unless several filters are used one after the other until one finally shows little or no trace of contaminants.

The inventor has found that the real cause of trouble in refrigeration systems lies more in the oil than in the refrigerant. That being the case, no amount of flushing-out of a system with clean refrigerant, as has been the practice in the past, will produce a really clean, acid free mixture of oil and refrigerant.

In a normal refrigeration system, the compressor is, of course, supplied with oil for lubricating purposes. A portion of this oil is also introduced into the flow of refrigerant for lubricating the various parts and valves throughout the system.

The refrigerant itself is actually a very good cleaning agent. Even in a newly installed system there will be present construction dust, flux, oxidization, moisture and the like which should be purged from the system before regular operation. These and subsequently accumulated contaminants will be cleaned away by the refrigerant.

As the refrigerant and oil are circulated through the system, the oil becomes a scavenger of all contaminants. Especially when the refrigerant and oil pass through the expansion valve and into the evaporator where the refrigerant vaporizes, the oil collects from the refrigerant and retains the impurities leaving the refrigerant relatively clean. As the refrigerant and oil re-enter the low side of the compressor, usually through a restricted orifice, the vaporized refrigerant passes through to the high side of the compressor and the oil drops into the crankcase carrying the contaminants with it. In the crankcase much of the contaminants settle and form sludge which can be redistributed through the system.

In normal burn-out preventative maintenance, where the refrigeration system may be flushed several times with new refrigerant and in-line filters and driers changed with every flushing, the highly contaminated sludge in the crankcase may go relatively unaffected.

The present invention provides a portable purifier which is capable of being readily connected to and disconnected from a refrigeration system and is capable of filtering out contaminants while the system remains operational as small as one one hundredth ($\frac{1}{100}$) of a micron. The purifier is relatively inexpensive and compact and yet is highly efficient and its filter elements may be replaced quickly and easily.

It is the main object of the present invention to provide an apparatus for purifying refrigerant and oil in a refrigeration system by drawing the contaminants from where they most collect while the system remains operational.

It is another object of the invention to provide a fluid purifier which is highly efficient and yet may be easily connected to and disconnected from an independent refrigeration system allowing said system to remain operational.

Still another object of the invention is to provide a portable refrigeration system purifier which can purify refrigerant and oil without necessitating the removal thereof in bulk from the refrigeration system.

Another object of the invention is to provide a portable purifier in which the filter elements can be readily cleaned or replaced.

Still another object of the invention is to provide a generally improved refrigeration system purifier.

Other objects and advantages will be apparent from the description in conjunction with the drawings, in which:

FIG. 1 is a front elevational view of the purifier showing one manner of its connection to a refrigeration system;

FIG. 2 is an enlarged elevational view of the back of the purifier with the back cover removed;

FIG. 3 is a bottom plan view of the purifier with the bottom cover removed;

FIG. 4 is a flow diagram of the purifier;

FIG. 5 is an enlarged, vertical cross-sectional view of one of the filter elements of the purifier showing two filtering media therein; and, FIG. 6 is a cross-sectional view of a modified filter element, on a smaller scale than FIG. 5, which contains three filtering media.

DESCRIPTION OF THE PREFERRED EMBODIMENTS

The purifier, generally designated 11, may be connected, as is shown in FIG. 1, to a refrigeration system compressor 12 by suitable conduits 13 and 14. While a purifier of the type herein described may be interposed into the refrigerant flow line for decontamination of the refrigerant, this description will be concerned mainly with the purification and decontamination of the real scavenger of refrigeration systems, the oil. In order to purify the oil it is desirable to tap the oil at that low pressure point in the system at which the contaminants are most likely to be found and that point is usually the sump of the crankcase. In order to reach the sump, a long tube 7 may be passed through an opening in a compressor crankcase housing such as a dipstick port, which tube 7 is then connected to conduit 13.

Return conduit may enter the low pressure side of the compressor at any convenient point, but for use with many compressors it is convenient to use a single port in the crankcase housing to take oil from the crankcase and to return it. To accomplish this, the present invention includes a second tube 8 of larger diameter than and shorter than tube 7. Tube 8 is coaxial around tube 7 and is connected to return conduit 14. Thus, it can be seen that oil is taken from the bottom of the crankcase through tube 7 and returned to the crankcase at a higher level through tube 8, both through the same port in the crankcase housing.

The purifier 11 may be enclosed in a box 16 made of a convenient material such as sheet aluminum. Mounted on the front panel 17 of the box 16 may be valves 18 and 19 through which fluid passes to and from the purifier. Meters 21 by which fluid pressures at various points in the purifier may be monitored may also be mounted on the front panel 17, and a power cord 24 from a conventional source (not shown) may also pass therethrough. A power switch 26 may also be mounted thereon.

Mounted within the box 16 is a motor operated pump 27. To the input 28 of the pump is connected a strainer 29 capable of trapping all particles of sufficient size to damage the pump. A tube 31 connects the strainer 29 to the valve 18 to which the conduit 13 from the refrigeration system is connected.

To the output port 32 of pump 27 is connected a check valve 33 by which one way passage of fluid through the purifier is controlled, and a tube 34 connects the check valve to the input port 36 of the first of series of one or more filters 37 which may be suspended from the top 38 of the box 16 by brackets 39. The commercial embodiment of the invention utilizes three filters 37 and three meters 21, so that number is disclosed and described, but any convenient number can be used within the scope of the invention. The first meter 21 is connected to the tube 34 to monitor the fluid pressure therein registering changes in pressure caused by loss of filtering efficiency in the filter 37 immediately downstream.

As shown particularly in FIG. 5, each of the filters 37 has an end plate 41 to which is removably sealed a cylindrical canister 42, open at one end. The canister has an outwardly directed flange 43 about the open end which mates with a sealing ring 44 of suitable sealing material, such as rubber, which is seated in a groove 46 formed in said end plate near the periphery thereof. The flange 43 extends upwardly at a small angle to a radius of the canister. The canister flange and the end plate are held tightly together forming a sealed container by a ring clamp 47 which may be compressed by a conventional ever-center latch (not shown). The inner surface of the ring clamp has the general shape in cross-section of a truncated V, so that when it engages the flange 43 and a beveled surface 48 about the upper circumferential edge of the end plate and the over-center latch is closed, a tight seal is effectuated.

The inlet port 36 of the filter is a hole passing through the approximate center of the end plate 41 axially of the filter. A cylindrical sleeve 49, with which the port 36 connects, is secured around a boss extending outwardly of end plate 41 and extends axially of the filter from adjacent the center of the end plate 41 into the canister 42 to a spaced distance from the closed end 51 thereof. An outlet port 52 also passes axially through the end plate 41 at a point outside of the sleeve 49.

The element to be used for filtering and purifying fluid is placed within the canister 42 but outside of the sleeve 49. For any given filtering system one or a number of materials may be used as the filtering media of a given filter element, depending on the fluid to be purified. In the three-filter system shown and described, successful results have been obtained by using two media in the first two filters in sequence and a single media in the third although it should be understood that separate media can be used in each filter. In each of the first two filters, as shown in FIG. 5, a first medium 53, such as activated alumina, is placed in the bottom of the canister 42 adjacent closed end 51, to neutralize acids, etc., and a second medium 54, such as relatively loosely packed cellulose, is placed in the top of the canister adjacent the open end to filter out large contaminants in particle form and collect water. These media may be held in the canister by a snap ring 56.

Flow of fluid from the sleeve 49 to the first medium 53 is facilitated by channels 57 in the closed end 51 of the canister which distribute fluid over a large portion of the medium. Fluid flow out of the second filtering medium and into the outlet port 52 may be facilitated by shallow grooves 58 in the end plate 41 leading to the output port and by a pair of screens 60 of different degrees of coarseness lying against the top plate. The screens may be held against the top plate by a metal backing washer 59 received around sleeve 49 and an elastic seal 61 which fits snugly against the sleeve and conforms to said backing washer to press even more snugly against said sleeve when under pressure. The filtering medium is thus held away from the end plate to permit fluid flow.

At the interface between the first and second media, flow is aided by perforated means such as a pair of screens 62, similar to the screens 58, or a screen and a stiffer, perforated plate. These screens or a screen and plate tend to space the media from one another so that fluid from one portion of the first medium may flow across all portions of the second. A channelling of flow or the selection of the path of least resistance through the first medium, which may occur, thus does not render a portion of the second medium ineffectual, and the plaque which tends to build up on the surface of a filter element will not build up as fast since it can build up over a larger area. The use of two media in a filter further reduces the effect of plaque by giving more surfaces for the solid contaminants to be deposited upon, and the additional number of surfaces provides for a better filtering action.

In the present embodiment, the third filter is completely filled by a third medium, a roll of tightly packed cellulose resembling a roll of toilet paper, which filters out contaminants present in the fluid as small as one one-hundredth of a micron. A cross section of this filter element has not been shown since it would be identical to FIG. 5 except that the media 53 and 54 would be one and the screen 62 would be absent. It is also apparent that more media than the two shown in FIG. 5 could be used by stacking them one above the other in the canister 42 with screens like those shown at 62 separating the media.

An alternate form of the invention is shown in FIG. 6 when it is desired to use only one filter element, perhaps mounted on its side within the box 16. The top plate 63 and ring clamp 64 are identical to 41 and 47 respectively in FIG. 5, however, the sleeve 66 and canister 67 are roughly three times as long as 49 and 42, respectively, in FIG. 5. As shown the three filtering media 68, 69 and 71 may be the same as 53, 54 and the one in the third filter element and they may be separated by screens 72 similar to 62. Further, interfaces may be provided by inserting screens within the media or by alternating smaller portions of, for example, media 68 and 69 separated by screens. In other respects the filter element of FIG. 6 operates in the same manner as that in FIG. 5.

In the three-filter embodiment of the invention shown, the output port 52 of the first filter is connected to the input port of the second filter is connected to the input port of the third filter by a tube 73. A tube 74 connects the second of the meters 21 to the tube 72 and a tube 76 connects the third of the meters 21 to the tube 73 so that the pressures in the tubes 72 and 73 may be monitored. A tube 77 passing through the front panel 17 then connects the output port of the third filter to the valve 19 for return of the fluid to the refrigeration system 12 through the conduit 14.

Cooling for the pump 27 may be provided by a electric fan 78 mounted at some convenient point in the box 16 to blow hot air out of the box through a grate 79 mounted in a wall thereof. A grate 81 may also be mounted at some other convenient point of the box to allow outside air to flow into the box.

While the particulars of the electrical wiring are not shown in FIGS. 2 and 3, the pump 27 and the fan 78 are electrically powered and they receive current through the power cord 24 by conventional circuitry. The power switch 26 is provided to turn them on and off.

In a properly operating, efficiently filtering purifier, meters 21 will reflect proper operating pressures in the filters immediately downstream. However, if channelling occurs in a filter its operatively associated meter may show a drop in pressure indicating the need to replace the filtering element in the particular container. Should a meter show an increase in pressure, its associated filter element may be saturated with contaminants or a surface obstructed with a plaque-like buildup of solids again reflecting the need for replacement of the element. Meters 21 also reflect improper sealing of the canisters and loss of pressure in the various conduits.

The various filter elements may be fabricated somewhat differently depending on the particular media in a particular element.

In fabricating a multi-media element, a core member 82 may first be secured to the closed end plate 51 within canister 42 by a deposit of adhesive 83 such as epoxy. A first media such as activated alumina 53 is then inserted within the canister around core 82 in the desired quantity. Perforate spacing means 62 are next inserted and then the other media such as a desiccant or a relatively loose pack cellulose 54. Although not always necessary, a layer or two of felt or the like may then be placed over the open end of the canister and around the core 82 and retainer ring 56 may then be inserted.

A single media element is fabricated in the same manner except there may be no perforate spacing means.

In fabricating the final, high density filtering element, a roll of high quality, relatively tightly packed cellulose is used as the filtering media. This is a specially made roll resembling a roll of toilet paper except the cellulose is of a higher grade, the interrelation of the fibers is more uniform, the roll is much more tightly and uniformly wound and there are no perforated lines of weakness as in ordinary toilet paper. A roll of toilet paper could be used with decreased efficiency since it would not be as tight or as uniform and the perforated lines of weakness would encourage channelling of the fluid being filtered.

All filter elements are dehumidified by baking at a high temperature and hermetically sealed in plastic bags or the like under vacuum to insure that when they are put to use they are contaminant and moisture free within practical ranges.

In operation, for burn-out preventitive maintenance, the purifier may be attached to a compressor by means of the single unit draw and return tubes 7 and 8. Before attaching the purifier it is necessary to saturate the purifier with clean refrigeration oil by filling all filter elements and all conduits with such oil. Conduit 13 is introduced into a reservoir of clean oil and pump 27 is actuated. Conduit 14 is placed in the vicinity of said reservoir and when oil begins passing out of the end of conduit 14 and back into the reservoir the purifier should be saturated. Pump 27 may be surged a time or two to be sure that the purifier is purged of air.

Valves 18, 19 are closed, connection is then made between tubes 7, 8 and conduits 13, 14 respectively, all valves are opened and pump 27 reactivated. Since purifier 11 is saturated with oil, the oil level within the crankcase of compressor 12 will remain substantially the same and the compressor remains operational.

The compressor continues its work of circulating refrigerant and oil throughout the refrigeration system while the purifier independently taps oil from the sump of the compressor crankcase reservoir.

After a predetermined length of time, depending on the capacity of the particular refrigeration unit, a sample of the crankcase oil is tested for clarity, odor and acidity. If there is no trace of odor or acid and if the oil is clear, the cleaning is finished. Depending on the system, in-line filters and driers may be replaced.

When the above operation is performed on a newly installed system, all of the construction contaminants and moisture are removed before they can start trouble.

The procedure would be somewhat different following an actual burn-out of the compressor. After a burn-out, the entire refrigeration system is contaminated. If only the compressor and essential parts are replaced the remainder of the system will still contain acid, moisture, dirt, burnt varnish, abrasives and the like which will materially reduce the life of the replacement compressor.

After a burn-out, the old compressor is replaced and purifier 11 is attached to the new compressor as above described. All of the contaminated fluids are then evacuated from the system by the new compressor as quickly as possible. Any in-line filters or driers as well as the internal parts of the expansion valve are then removed in order to allow for freely flushing out the system. The system may then be pumped down or evacuated additional times to be sure all contaminated oil ends up in the crankcase of the new compressor. Having been cleaned, the internal parts are re-installed in the expansion valve and new in-line filters and driers are installed. As above described, the new compressor and refrigeration system remain operational and the present purifier remains attached to the new compressor and in operation until all fluids in the system pass the various tests for cleanliness.

When cleaning any system with the present purifier, if there is too much refrigerant in the crankcase oil, it will be vaporized while passing through the purifier with the warm oil and when the fluids are reintroduced into the crankcase, the vaporized refrigerant will pass on to the high side of the compressor. This prevents hydraulic lock in the compressor occasioned by the presence of excessive amounts of liquid refrigerant in the compressor.

It might be noted that in a refrigeration system having a reservoir of refrigerant at atmospheric pressure, or some point at less than the pressure of the refrigerant at the high side of the compressor, the path of flow of the refrigerant could be tapped at a high pressure point and returned to the flow after filtration at a low pressure point without the necessity of any impelling force other than that used in the refrigeration unit to cause flow of refrigerant therethrough.

The above described methods and apparatus greatly reduce service time on refrigeration units, and greatly reduce the expense for oil, refrigerant and in-line filters and driers and the like encountered in usual refrigeration servicing; and the results are far superior to flushing, refrigerant recirculation, pressurized refrigerant and filter-drier methods currently in use.

By the present method and apparatus, the endless path of flow in a refrigeration system of refrigerant and oil, which together for purposes of this application have been referred to as coolant, are tapped and as much as possible of said flow is drawn off to the present purifying apparatus for filtration. So the refrigeration system can remain operational, an amount of refrigerant oil equal to that drawn off is provided for use in the system during filtration by saturating the purifier itself prior to beginning the filtering operation.

While it is desirable to decontaminate a system by tapping the point in said endless path of highest concentration of contaminants, said flow can be tapped with the present purifier at other points with satisfactory results compared to prior methods cleaning contaminated refrigeration systems. The compressor itself is included in said endless path although there may be a substantial separation of vaporous refrigerant and liquid oil therein. In many systems the sump of the crankcase of the compressor will be the desirable point at which to tap said endless path since the contaminants in the system will be concentrated there.

It should be understood that the above detailed description discloses the preferred forms of the present invention but it is not intended to be limiting as other forms and modifications may occur to those skilled in the art which will not depart from the spirit of this invention and which come within the scope of the appended claims.

I claim:

1. In an apparatus for decontaminating a refrigeration system having a defined path of flow of coolant comprising an oil solution of a refrigerant through said system, coolant in said path and compression means with a sump in said path for causing said coolant to flow within said path, said apparatus including: connecting means for releasably interconnecting said sump with said apparatus for removing oil therefrom and reintroducing oil thereinto; first conduit means operatively associated with said connecting means for diverting oil from said sump while said system remains operational; filter means connected to said first conduit means and adapted to pass oil diverted from said sump extracting contaminants therefrom; and second conduit means operatively interconnecting said filter means and said connecting means for reintroducing oil passed through said filter means into said sump while said system remains operational, the improvement wherein said connecting means includes:

(a) first tubular means adapted to be connected to said sump through an access opening in said compression means to draw oil therefrom for transmission to said first conduit means; and
    (b) second tubular means of greater diameter than said first tubular means and shorter than said first tubular means adapted to be received around said first tubular means allowing access to said sump through said access opening for introducing oil thereinto from said second conduit means.

2. An apparatus according to claim 1 wherein:

(c) said first tubular means is adapted to reach to the lowest point in said sump for drawing oil therefrom.

References Cited

UNITED STATES PATENTS

| | | | |
|---|---|---|---|
| 1,780,663 | 11/1930 | Winslow et al. | 210—136 |
| 2,010,435 | 8/1935 | Matheson | 210—168X |
| 2,027,400 | 1/1936 | Pennebaker | 210—168X |
| 2,073,442 | 3/1937 | Briggs | 210—168X |
| 2,218,226 | 10/1940 | Williams | 210—168 |
| 2,233,093 | 2/1941 | Carman et al. | 210—282X |
| 2,325,657 | 8/1943 | Burkness | 210—283X |
| 2,341,430 | 2/1944 | Elsey | 62—474X |
| 3,379,033 | 4/1968 | Grant | 62—84X |

SAMIH N. ZAHARNA, Primary Examiner

U.S. Cl. X.R.

210—168